(12) United States Patent  
Herrero

(10) Patent No.: US 9,332,049 B1  
(45) Date of Patent: May 3, 2016

(54) MEDIA COMPRESSION FOR TUNNELED REAL-TIME COMMUNICATIONS

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/698,077

(22) Filed: Apr. 28, 2015

(51) Int. Cl.  
*H04L 29/06* (2006.01)  
*H04L 12/46* (2006.01)

(52) U.S. Cl.  
CPC .......... *H04L 65/602* (2013.01); *H04L 12/4633* (2013.01); *H04L 65/40* (2013.01); *H04L 63/0272* (2013.01); *H04L 65/80* (2013.01)

(58) Field of Classification Search  
CPC .............................. H04L 63/0272; H04L 65/80  
See application file for complete search history.

(56) References Cited

U.S. PATENT DOCUMENTS

| 2002/0051464 | A1* | 5/2002 | Sin | H04L 29/06 370/466 |
| 2002/0141413 | A1* | 10/2002 | Schlaegl | H03M 7/30 370/394 |
| 2009/0122990 | A1* | 5/2009 | Gundavelli | H04L 12/4641 380/278 |
| 2009/0323632 | A1* | 12/2009 | Nix | H04L 29/125 370/331 |
| 2011/0069608 | A1* | 3/2011 | Miller | H04L 1/22 370/218 |
| 2013/0283037 | A1* | 10/2013 | Katz | H04L 63/04 713/151 |

OTHER PUBLICATIONS

H. Schulzrinne et al.; "RTP: A Transport Protocol for Real-Time Applications";Jul. 2003; 89 pages.  
3rd Generation Partnership Project; Technical Specification Group Services and System Aspects; Study on firewall traversal (Stage 2) (Release 12); 3GPP TR 33.830 V0. 5.0 (2013-11).

* cited by examiner

*Primary Examiner* — Ross Varndell  
(74) *Attorney, Agent, or Firm* — Miles & Stockbridge P.C.

(57) ABSTRACT

A system performs compression of real-time communications ("RTC"). The system establishes a tunnel with a user equipment ("UE") by a tunneling server, and communicates encapsulated media with the UE over the tunnel. Subsequently, the system receives a request from a tunneling client at the UE to enable compression for the encapsulated media, determines a codec for transcoding the encapsulated media at the tunneling client and at the tunneling server, and sends a response back to the UE to indicate that compression is enabled for the encapsulated media. The system then communicates compressed encapsulated media with the UE over the tunnel.

20 Claims, 6 Drawing Sheets

MEDIA COMPRESSION FOR TUNNELED REAL-TIME COMMUNICATIONS

FIELD

One embodiment is directed generally to a communications network, and in particular, to delivering real-time traffic over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

Embodiments provide a system for performing compression of real-time communications ("RTC"). The system establishes a tunnel with a user equipment ("UE") by a tunneling server, and communicates encapsulated media with the UE over the tunnel. Subsequently, the system receives a request from a tunneling client at the UE to enable compression for the encapsulated media, determines a codec for transcoding the encapsulated media at the tunneling client and at the tunneling server, and sends a response back to the UE to indicate that compression is enabled for the encapsulated media. The system then communicates compressed encapsulated media with the UE over the tunnel.

DETAILED DESCRIPTION

One embodiment provides media compression services for real-time communications ("RTC") in a network environment. In one embodiment, a tunneling client inspects packet formats of encapsulated traffic within a tunnel to determine whether the encapsulated traffic includes data or real-time media. If real-time media traffic is detected in the encapsulated traffic, the tunneling client transcodes the packets such that the encapsulated media traffic occupies a smaller bandwidth. Accordingly, embodiments use the tunnel bandwidth more efficiently and thereby improve the tunnel throughput.

Figure 1:
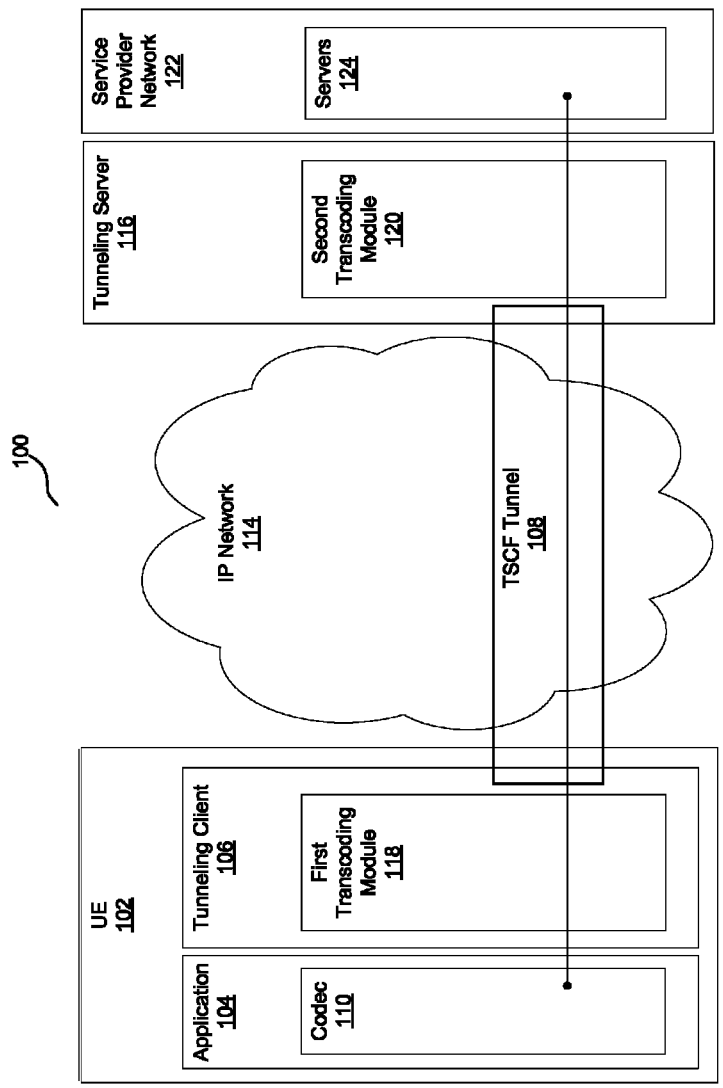
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs RTC over an Internet Protocol ("IP") network 114 with a service provider network 122. RTC refers to a mode of communications in which users exchange information instantly or with negligible latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In general, using a tunnel for communications refers to using a delivery protocol to encapsulate a different payload protocol.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage a corresponding TSCF tunnel so that UE 102 may use the TSCF tunnel to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value. The unique type is represented by an integer while the value is the actual value identified by the type.

Each TSCF control message includes a control message header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, the TSCF tunnel is terminated.

In one embodiment, UE 102 executes an application 104 that may be a SIP based RTC application relying on a library such as the software development kit ("SDK") provided by the tunneled session management solution from Oracle Corp.

Figure 2:
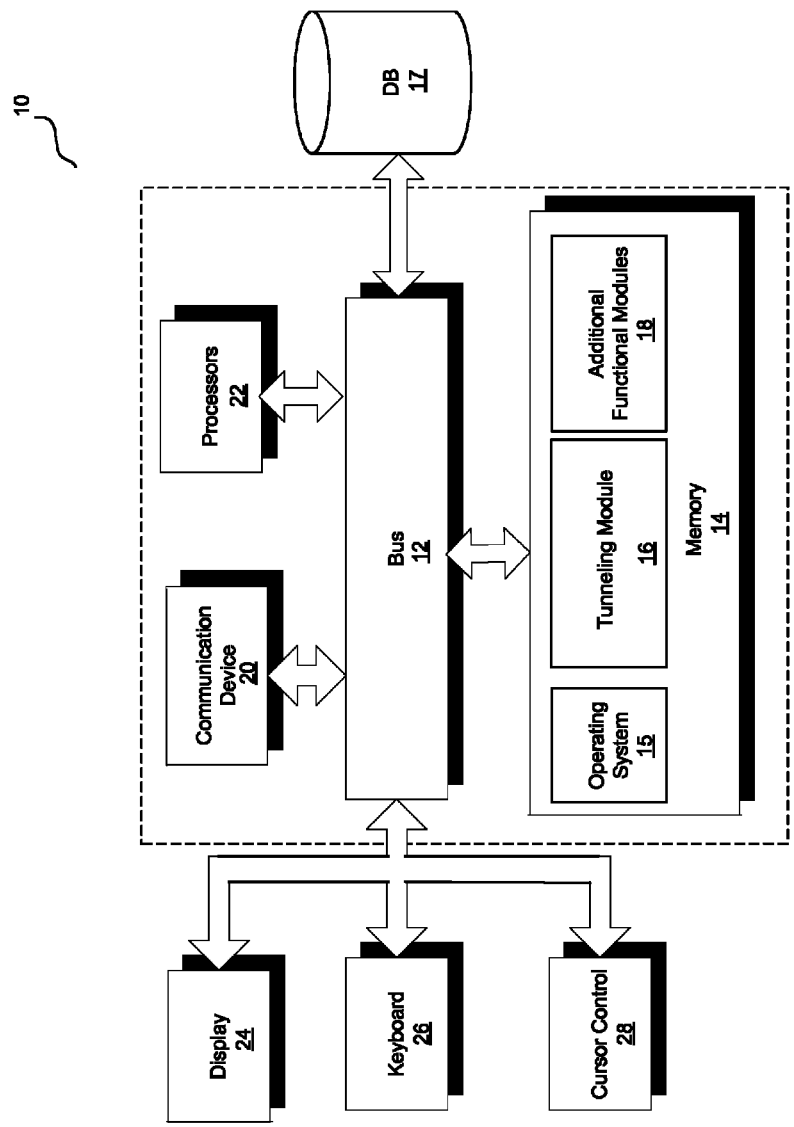
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a tunneling module 16 for providing tunneling, and all other functionality disclosed herein. In one example embodiment, tunneling module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for tunneling module 16 and additional functional modules 18.

Figure 6:
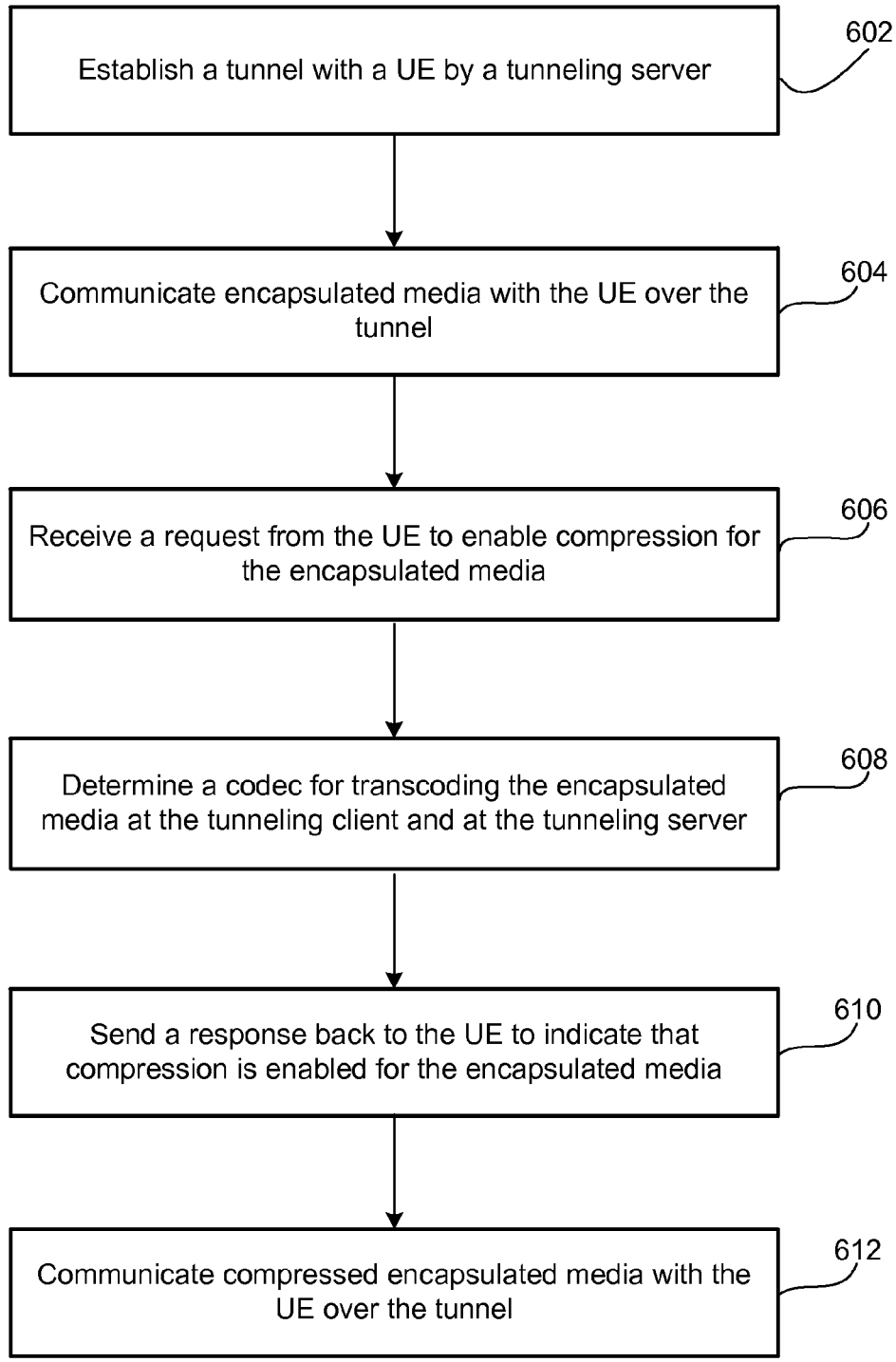
FIG. 6 is a flow diagram of the operation of the tunneling module of FIG. 2 when performing tunneling in accordance with embodiments of the present invention.

In one embodiment, tunneling module 16 and/or additional functional modules 18 may include an establishing module that establishes a tunnel with a UE by a tunneling server; a communicating module that communicates encapsulated media with the UE over the tunnel; a receiving module that receives a request from a tunneling client at the UE to enable compression for the encapsulated media; a determining module that determines a codec for transcoding the encapsulated media at the tunneling client and at the tunneling server; a sending module that sends a response back to the UE to indicate that compression is enabled for the encapsulated media; and a communicating module that communicates compressed encapsulated media with the UE over the tunnel, as will be described herein with reference to FIG. 6.

Referring again to FIG. 1, with known systems, tunneling client 106 and tunneling server 116 may establish a TSCF tunnel 108 that encapsulates different types of traffic ranging from pure data to real-time media. In general, data is sensitive to integrity while real-time media is sensitive to latency. In some known systems, encapsulated media is typically communicated according to the real-time transport protocol ("RTP" as provided, for example, in IETF RFC 3550).

In some known systems, encapsulated media that is packetized according to RTP includes a compressed payload encoded by a codec 110 within application 104. A codec performs compression and/or decompression of a data stream or signal according to a bitrate (the number of bits conveyed or processed per unit of time).

In some known systems, the compressed payload of packetized encapsulated media may be encoded by a high bitrate codec such as G.711 as provided, for example, according to the International Telecommunication Union ("ITU") Telecommunication Standardization Sector ("ITU-T") standard.

One disadvantage with these known systems is that media streams that are compressed with a high bitrate codec occupy excessive bandwidth. For example, with the same bandwidth that is used to transmit a single media stream transcoded using a high bitrate codec such as G.711, it is possible to transmit between 8 and 12 streams of speech transcoded using a lower bitrate codec such as G.729 as provided, for example, according to the ITU-T standard. Transcoding is the direct analog-to-analog or digital-to-digital conversion of one encoding to another.

One known solution for more efficient bandwidth consumption is that before compressing speech (and media in general), the endpoints may negotiate codecs at the application layer via a signaling protocol. However, notwithstanding the aforementioned negotiation, high bitrate codecs are typically selected and used due to client and/or network limitations. Further, the resulting high bitrate transcoded media is encapsulated within a tunnel such as TSCF tunnel 108, the tunneling architecture does not affect the flow of traffic and transmits it transparently at the same high bitrate, therefore resulting in an unnecessarily high bandwidth consumption.

In contrast to the known solutions, embodiments of the present invention provide an encapsulation configuration that automatically detects media traffic and transcodes it using a lower bitrate codec as it traverses TSCF tunnel 108. In some embodiments, the detection and compression/transcoding of embedded media streams within TSCF tunnel 108 is performed independently of the application layer (i.e., independently of application 104).

One embodiment provides media compression functionality by implementing a first transcoding module 118 at tunneling client 106 and a second transcoding module 120 at tunneling server 116. In one embodiment, first transcoding module 118 at tunneling client 106 inspects encapsulated traffic in TSCF tunnel 108 to differentiate between data and real-time media based on their different traffic patterns, and performs compression on demand to improve the throughput of TSCF tunnel 108. In one embodiment, first transcoding module 118 transparently initiates media compression whenever real-time media is detected in encapsulated traffic in TSCF tunnel 108.

In one embodiment, first transcoding module 118 notifies application 104 whenever real-time media is detected in encapsulated traffic in TSCF tunnel 108. In one embodiment, when first transcoding module 118 detects a transition from real-time media to data mode, or vice versa, it notifies application 104 by indicating the inner socket affected by such transition. A network socket is an endpoint of an inter-process communication flow across a computer network according to a communications protocol. A network socket may be a datagram socket (a connectionless network socket) or a stream socket (a connection-oriented and sequenced socket). In general, for regular communications, a user can create a datagram or stream socket that uses the network interface of the system in which the application runs. In a TSCF environment, however, sockets use a tunnel for transport instead of a network interface. To differentiate these sockets from regular sockets, they are referred to as "inner sockets" since they only exist inside a tunnel. That is, an inner socket only exists in association with a tunnel and socket traffic gets transported by the tunnel.

In one embodiment, first transcoding module 118 determine whether the traffic pattern in TSCF tunnel 108 is indicative of real-time media or not by performing inner datagram packet analysis. When first transcoding module 118 detects a transition to real-time media in TSCF tunnel 108, it tries to negotiate media compression with second transcoding module 120 at tunneling server 116. Upon a successful negotiation, media compression is enabled at first transcoding module 118 and second transcoding module 120. Thereafter, if first transcoding module 118 detects a transition to data mode in TSCF tunnel 108, it tears down (i.e., terminates) the media compression functionality that was negotiated with second transcoding module 120.

In one embodiment, when media compression is negotiated between first transcoding module 118 and second transcoding module 120, they both transcode high bitrate media into low bitrate media before encapsulation, and transcode low bitrate media into high bitrate media after de-encapsulation. In one embodiment, based on load requirements of tunneling server 116, compression functionality may be asymmetric, for example, affecting only the traffic from tunneling client 106 to tunneling server 116 and not the other way around.

For example, since transcoding introduces computational complexities that require specific signal processing resources, if those resources are limited at tunneling server 116, tunneling server 116 may be able to perform decoding but not encoding, hence not allowing the implementation of transcoding functionality that is symmetric across tunneling client 106 and tunneling server 116. The resources that are limited at tunneling server 116 include, for example, a specific number of concurrent channels required for performing encoding and a specific number of concurrent channels required for performing decoding. In one embodiment, performing decoding may require much lighter resources than performing encoding, therefore the limitation of resources at tunneling server 116 typically relates to performing encoding.

In one embodiment, for example, G.711 encoding and decoding to/from raw speech is according to a non-linear conversion formula between 16-bit samples and 8-bit samples. However, G.729 encoding of raw speech is more complex and requires extensive signal processing resources, while G.729 decoding of compressed speech is simpler than its encoding and does not require as much resources. Accordingly, if tunneling client 106 converts traffic from G.711 to raw speech and from raw speech to G.729 before transmitting to tunneling server 116, tunneling server 116 may be serving multiple (e.g., thousands) of simultaneous clients and thus may not have enough resources to convert raw speech to G.729 before transmitting to tunneling client 106 in the opposite direction. Therefore, the transmissions between tunneling client 106 and tunneling server 116 may not be symmetrical and the only conversion to low bitrate may be performed for traffic sent from tunneling client 106 to tunneling server 116, resulting in asymmetric transcoding.

One embodiment provides TSCF SDKs that support application programming interface ("API") notification that provides functionality for first transcoding module 118 to notify application 104 of the detection of a transition from real-time media to data mode, or vice versa, in TSCF tunnel 108.

Figure 3:
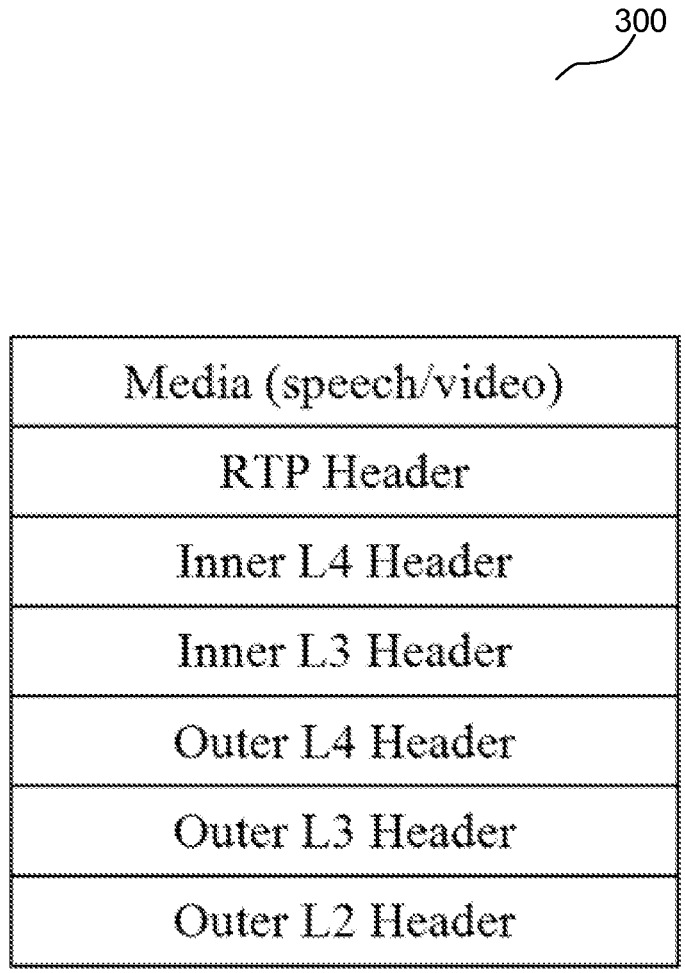
FIG. 3 shows example protocol layers in a tunneling configuration in accordance with an embodiment of the present invention.

FIG. 3 shows example protocol layers in a tunneling configuration 300 for TSCF tunnel 108. In tunneling configuration 300, real-time media is sent inside TSCF tunnel 108 by encapsulating the media information as payload of the RTP protocol. The encapsulated traffic includes the media payload, an RTP header, an inner layer 4 ("L4") header, an inner layer 3 ("L3") header, an outer L4 header, an outer L3 header, and an outer layer 2 ("L2") header. L2, L3, and L4 are layers of the Open Systems Interconnection ("OSI") model as defined by the International Organization for Standardization ("ISO"). The OSI model includes seven logical layers, where layer 1 ("L1") is the physical layer, L2 is the data link layer, L3 is the network layer, L4 is the transport layer, layer 5 ("L5") is the session layer, layer 6 ("L6") is the presentation layer, and layer 7 ("L7") is the application layer. In tunneling configuration 300, the RTP header may be used to identify the presence of real-time media traffic in TSCF tunnel 108.

Figure 4:
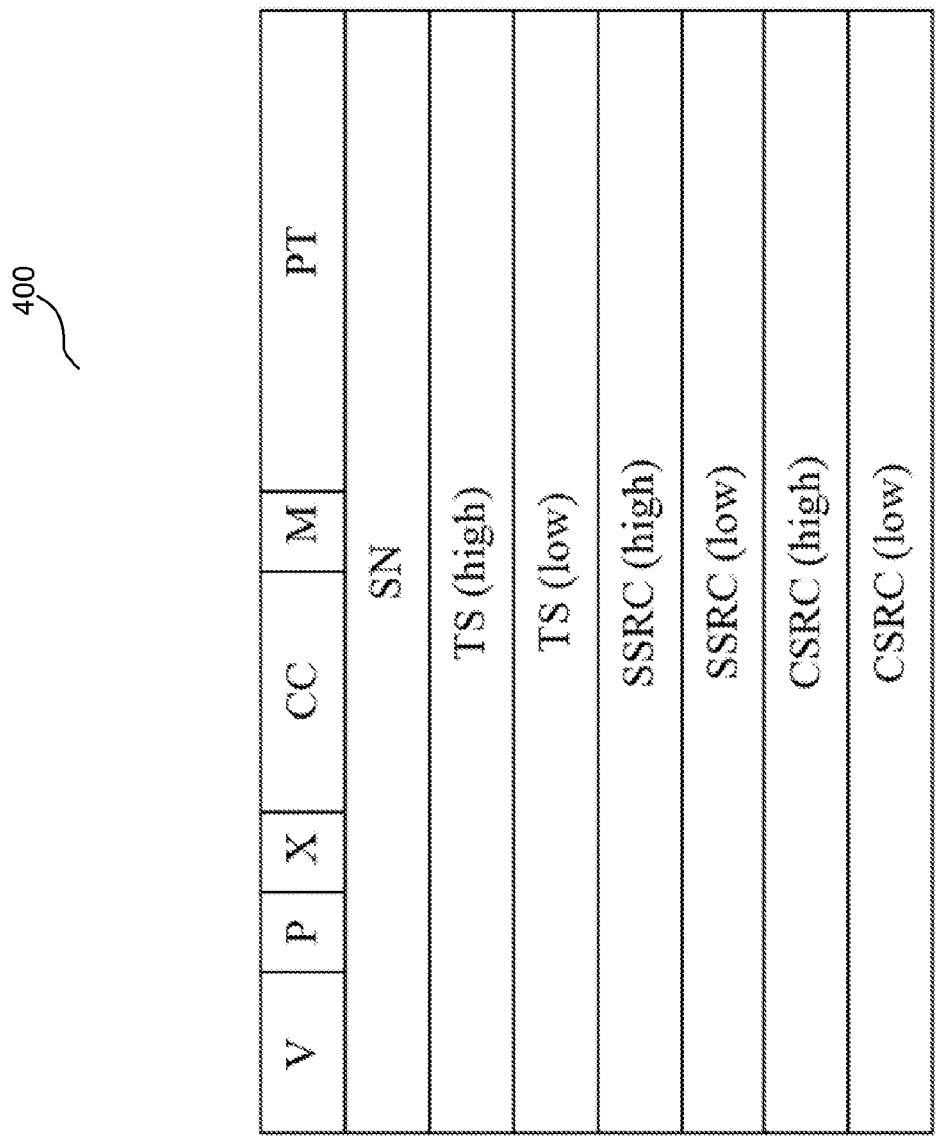
FIG. 4 shows an example real-time transport protocol ("RTP") header configuration in accordance with an embodiment of the present invention.

FIG. 4 shows an example RTP header configuration 400 in tunneling configuration 300 of FIG. 3. In one embodiment, first transcoding module 118 may detect media traffic in TSCF tunnel 108 by analyzing inner datagram packets and determining whether they include RTP headers. RTP header configuration 400 includes a Version field (denoted as "V") indicating the version of the protocol, a Padding field (denoted as "P") indicating if there are extra padding bytes at the end of the RTP packet, an Extension filed (denoted as "X") indicating presence of an extension header between standard header and payload data, a Contributing source ("CSRC") count field (denoted as "CC") indicating the number of CSRC identifiers that follow the fixed header, a Marker field (denoted as "M") used at the application level, a Payload Type field (denoted as "PT") indicating the format of the payload, a Sequence Number field (denoted as "SN") incremented by one for each RTP data packet sent a Timestamp field (denoted as "TS(high)" and "TS(low)") used to enable the receiver to play back the received samples at appropriate intervals, a Synchronization Source ("SSRC") field (denoted as "SSRC (high)" and "SSRC(low)") uniquely identifying the source of a stream, and a CSRC field (denoted as "CSRC(high)" and "CSRC(low)") indicating the contributing source identifiers.

In RTP header configuration 400, fields V, SSRC, and PT are fixed for every media stream, and field SN is a 32 bit number that increases with every packet being transmitted. Accordingly, in one embodiment, first transcoding module 118 may detect a media stream in TSCF tunnel 108 when a sequence of consecutive frames have headers with the same V, SSRC, and PT fields, and each header in the sequence has an SN field that is larger than the SN field of the previous header by one. In one embodiment, first transcoding module 118 may examine a certain number of consecutive frames (e.g., 5 frames) before indicating a media stream, or otherwise data, in TSCF tunnel 108. Similarly, when a sequence of consecutive frames have headers that do not match the format expected of consecutive RTP headers, first transcoding module 118 may detect pure data in TSCF tunnel 108.

In one embodiment, first transcoding module 118 detects a traffic pattern in TSCF tunnel 108 (e.g., a media stream or otherwise pure data) according to the following example functionality:
Initialization:
lastV=0
lastSSRC=0
lastPT=0
lastSN=0
count1=0
count2=0
state=DATA
end
OnIncomingPacket(pkt):
If (pkt.V==lastV AND
pkt.SSRC==lastSSRC AND
pkt.PT==lastPT AND
pkt.SN==lastSN+1) then
lastV=pkt.V
lastSSRC=pkt.SSRC
lastPT=pkt.PT
lastSN=pkt.SN
count1=count1+1
if (state==DATA AND count1>COUNT_THRESHOLD) then
OnMediaDetectedCallback( )
state=MEDIA
end
count2=0
else
count2=count2+1
if (state==MEDIA AND count2>COUNT_THRESHOLD) then
OnDataDetectedCallback( )
state=DATA
end
count1=0
end
end In the above functionality, "COUNT_THRESHOLD" is a pre-configured number (typically 5). Once first transcoding module 118 detects media or data in TSCF tunnel 108, it notifies both application 104 and second transcoding module 120 at tunneling server 116.

Figure 5:
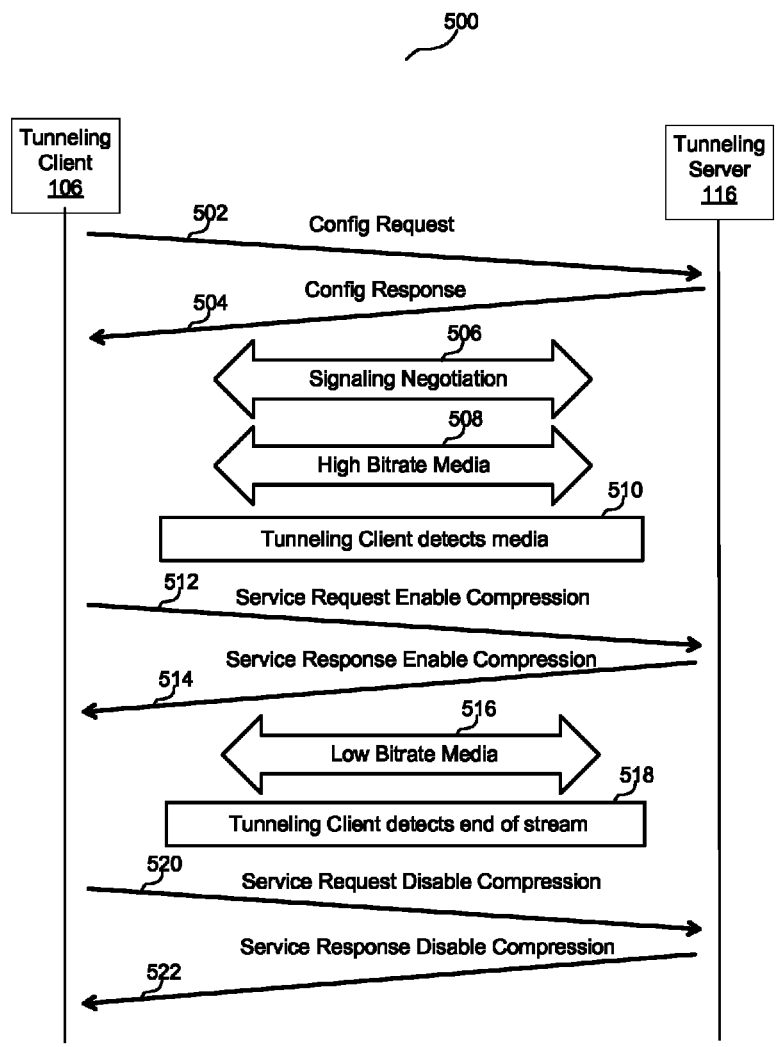
FIG. 5 is a message sequence diagram in accordance with embodiments of the present invention.

FIG. 5 is an example message sequence diagram 500 including the sequence of TSCF control messages exchanged between tunneling client 106 and tunneling server 116 for providing media detection and compression services, according to some embodiments. FIG. 5 includes network elements such as tunneling client 106 and tunneling server 116, as described herein with reference to FIG. 1.

At 502 tunneling client 106 sends a configuration request message to tunneling server 116 to establish TSCF tunnel 108, and at 504 tunneling server 116 responds to the configuration request message of tunneling client 106 with a configuration response message. Configuration request and response messages allow for tunneling client 106 to obtain configuration information for TSCF tunnel 108 from tunneling server 116, as described in, for example, 3GPP TR 33.830 V0.5.0. Accordingly, TSCF tunnel 108 is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116. In one embodiment, from the RTC application perspective, application 104 at UE 102 creates TSCF tunnel 108 by executing a "tsc_ctrl_new_tunnel" API, and the configuration request message is sent to tunneling server 116 in response to the execution of this API.

Upon completing the exchange of configuration request/response messages, tunneling client 106 and tunneling server 116 may use TSCF tunnel 108 for performing RTC and communicating signaling traffic and media traffic. For example, tunneling client 106 and tunneling server 116 may use TSCF tunnel 108 to perform signaling negotiation at 506 and to communicate high bitrate media at 508. In one embodiment, when inner signaling and media sockets are needed to place a call (e.g., for communicating SIP call control traffic or RTP media traffic), application 104 creates these sockets on TSCF tunnel 108 by executing a "tsc_socket" API. A socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in TSCF tunnel 108, there is a binding at tunneling server 116 that links the internal IP address of TSCF tunnel 108 to that socket.

At 510 first transcoding module 118 at tunneling client 106 detects that high bitrate RTP media is flowing through TSCF tunnel 108, and subsequently at 512 first transcoding module 118 sends a TSCF service request message to tunneling server 116 to enable compression functionality.

At 514 second transcoding module 120 at tunneling server 116 receives this service request message and, if tunneling server 116 can comply with the compression request, answers back to first transcoding module 118 with a TSCF service response message to confirm that compression functionality is enabled. In one embodiment, tunneling server 116 may not be able to comply with the compression request if, for example, it does not have transcoding resources or if the requested codec is not supported/implemented at tunneling server 116.

Upon enabling compression functionality, at 516 tunneling client 106 and tunneling server 116 start communicating low bitrate compressed media over RTP through TSCF tunnel 108. In one embodiment, since the input to a codec is raw speech (e.g., with 16 bits per sample at an 8 KHz sampling rate), when first transcoding module 118 receives high bitrate payload from application 104, it first converts it to raw speech and then compresses it into low bitrate payload to be transmitted as encapsulated media to second transcoding module 120. When second transcoding module 120 receives such low bitrate payload, it again converts it to raw speech and then compresses it into high bitrate payload to be transmitted to the untunneled side of the communication (e.g., servers 124 in service provider network 122). Similarly, when second transcoding module 120 receives high bitrate payload from the untunneled side of the communication, it first converts it to raw speech and then compresses it into low bitrate payload to be transmitted as encapsulated media to first transcoding module 118. When first transcoding module 118 receives such low bitrate payload, it again converts it to raw speech and then compresses it into high bitrate payload to be provided to application 104.

At 518 first transcoding module 118 at tunneling client 106 detects either an end-of-stream (indicating media transmission has ended) or detects data in TSCF tunnel 108, and subsequently at 520 first transcoding module 118 issues a TSCF service request message to tunneling server 116 to disable compression functionality.

At 522 second transcoding module 120 at tunneling server 116 responds back to first transcoding module 118 with a corresponding TSCF service response message indicating that compression functionality has been disabled.

One embodiment provides compression functionality by implementing a TSCF client service request message of type "Service_Type" with two TLV values indicating compression enablement and disablement, respectively. Further, a "Payload_Type" TLV is provided to indicate high bitrate and low bitrate codecs corresponding to the compression functionality, and a "Connection_Info" TLV is provided to indicate source and destination transport and network endpoints. Table 1 below provides example TSCF TLVs for providing compression services, according to some embodiments.

TABLE 1

Example TSCF TLVs for providing compression services

| TLV TYPE NAME | VALUE | SEMANTICS | SHORT/LONG FORMAT | VALUE TYPE | LENGTH | NOTES |
|---|---|---|---|---|---|---|
| Connection_Info_IPv4 | 24 | Client Connection Info | Short | Octet string | | |
| Connection_Info_IPv6 | 25 | Client Connection Info | Short | Octet string | | |
| Service_Type | 27 | Service Type | Short | Unsigned integer | 1 byte | Enable_Media_Compression = 11 Disable_Media_Compression = 12 |
| Payload_Type | 35 | Payload Type | Short | Unsigned integer | 1 byte | PCMU = 0 PCMA = 8 G723 = 4 G729 = 18 AMR-NB-rate-0 = 240 AMR-NB-rate-1 = 241 AMR-NB-rate-2 = 242 AMR-NB-rate-3 = 243 AMR-NB-rate-4 = 244 AMR-NB-rate-5 = 245 AMR-NB-rate-6 = 246 AMR-NB-rate-7 = 247 |

In Table 1, the "Payload_Type" TLV may indicate a high bitrate codec such as G.711 pulse code modulation ("PCM") μ-law ("PCMU") and G.711 PCM A-law ("PCMA"), or a low bitrate codec such as G.723, G.729, and adaptive multi-rate ("AMR") narrow band ("AMR-NB"). Typically, compression functionality involves transcoding a high bitrate codec (e.g., PCMU, PCMA, etc.) into a low bitrate codec (e.g., G.723, G.729, AMR-NB, etc.). However, in some embodiments, compression functionality may be provided to transcode between any two codecs that have the same or different bitrates.

In one embodiment, once compression functionality has been enabled for a given stream of media in TSCF tunnel 108, in order for tunneling client 106 or tunneling server 116 to process a given media packet, a respective one of first transcoding module 118 and second transcoding module 120 transcodes the frame from a high bitrate payload into a low bitrate payload, and changes the PT field in the RTP header of the frame to reflect the new codec corresponding to the low bitrate payload. In one embodiment, in order to provide compression functionality, first transcoding module 118 and second transcoding module 120 select a low bitrate codec based on codec availability at both tunneling client 106 and tunneling server 116.

One embodiment provides a configuration object "tscf-interface" that includes a parameter "assigned-services" with keywords "media-detection" and "media compression" that enable detection and compression of media, respectively. Table 2 below provides an example TSCF configuration object for providing compression services, according to one embodiment.

TABLE 2

An example TSCF configuration object for providing compression services

| Parameter Name | Extensible markup language ("XML") tag | Data Type and Default | Value Ranges/ Possible Values | Required or Optional (for feature to work)? |
|---|---|---|---|---|
| assigned-services | assigned-services | String: Blank | "media-detection" "media-compression" | Optional |

The following functionality provides an example "address-pool" configuration for providing compression services, according to one embodiment:
tscf-interface
  realm-id access
  state enabled
  max-tunnels 100
  local-address-pools Ip-1
  assigned-services SIP, media-compression
  tscf-port
    address 192.168.100.100
    port 4567
    transport-protocol CDP
    tls-profile
    rekey-profile The following is an example XML functionality for providing compression services, according to one embodiment:
<tscfInterface realmID='access'
  state='enabled'
  maxTunnels='100'
  assignedServices='SIP,media-compression'
  options=''
  objectId='36'>
  <key>access</key>
  <localAddressPool name=Ip-17>
  <tscfPort address='192.168.100.100'
    port='4567'
    transProtocol='CDP'
    tlsProfile=''
    rekeyProfile=''
</tscfInterface>

Some embodiments do not require SDK API changes at application 104 since compression functionality is triggered dynamically by tunneling client 106 based on TSCF configuration parameters. Accordingly, compression functionality may be provided transparently to application 104. However, some embodiments support application notification whenever first transcoding module 118 detects a transition from real-time media to data mode, or vice versa, in TSCF tunnel 108.

The following is an example functionality for enabling notification and for providing a corresponding callback:

```
tsc_notification_enable(handle, tsc_notification_media_detection,
media_detection_notification, NULL);
  void media_detection_notification(tsc_notification_data *notification)
  {
    tsc_notification_media_detection_info_data *media_detection_data =
(tsc_notification_media_detection_ info_data *)notification->data;
    if (media_detection_data && media_detection_data->available ==
    tsc_bool_true) {
      if (media_detection_data->enabled == tsc_bool_true) {
        printf("media detection notification enabled on socket %d\n",
media_detection_data->socket);
      } else {
        printf("media detection notification disabled on socket %d\n",
media_detection_data->socket);
      }
    } else {
      printf("media detection notification not allowed on socket %d\n",
media_detection_data->socket);
    }
  }
```

In the above functionality, the fourth "NULL" parameter in "tsc_notification_enable" is an opaque/private data pointer that can be recovered in the "tsc_notification_data" structure upon callback.

FIG. 6 is a flow diagram of tunneling module 16 of FIG. 2 and/or tunneling server 116 of FIG. 1 when performing compression in accordance with embodiments of the present invention. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602 tunneling client 106 and tunneling server 116 establish TSCF tunnel 108.

At 604 tunneling client 106 and tunneling server 116 communicate encapsulated media over TSCF tunnel 108;

At 606 first transcoding module 118 at tunneling client 106 inspects the traffic pattern in TSCF tunnel 108 and determines that encapsulated media is being communicated over TSCF tunnel 108 and sends a TSCF service request to tunneling server 116 to enable compression for the encapsulated media in TSCF tunnel 108. In one embodiment, first transcoding module 118 determines that the traffic pattern of TSCF tunnel 108 corresponds to the encapsulated media by identifying a sequence of consecutive headers conforming to RTP. In one embodiment, upon determining that the traffic pattern of TSCF tunnel 108 corresponds to the encapsulated media, first transcoding module 118 provides a corresponding notification to application 104 at UE 102 indicating an inner socket of the encapsulated media.

At 608 first transcoding module 118 and second transcoding module 120 determine a codec for transcoding the encapsulated media into compressed encapsulated media at tunneling client 106 and at tunneling server 116. In one embodiment, first transcoding module 118 and second transcoding module 120 determine the codec based on available codecs at tunneling client 106 and at tunneling server 116.

At 610 second transcoding module 120 at tunneling server 116 sends a TSCF service response back to first transcoding module 118 to indicate that compression is enabled for the encapsulated media in TSCF tunnel.

At 612 first transcoding module 118 and second transcoding module 120 communicate compressed encapsulated media over TSCF tunnel 108. In one embodiment, the encapsulated media includes high bitrate media, and upon enabling compression, first transcoding module 118 and second transcoding module 120 transcode the high bitrate media into low bitrate media and communicate the low bitrate media through TSCF tunnel 108. In one embodiment, if first transcoding module 118 subsequently determines that the traffic pattern of TSCF tunnel 108 has changed to encapsulated data, it sends a TSCF service request message to second transcoding module 120 to disable compression, and second transcoding module 120 responds back by sending a TSCF service response message indicating that compression is disabled.

As disclosed, embodiments allow for a TSCF tunneling configuration that provides media detection and compression functionality. Embodiments allow a tunneling client to detect media in a TSCF tunnel and initiate compression of encapsulated traffic. In one embodiment, upon automatically detecting encapsulated media, the high bitrate media payload is transcoded into a more efficient low bitrate payload. Accordingly, embodiments give the end user the possibility of improving tunnel throughput via a more efficient use of bandwidth.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform compression for real-time communications (RTC), the compression comprising:
    establishing a tunnel with a user equipment (UE) by a tunneling server;
    communicating traffic with the UE over the tunnel;
    receiving a request from a tunneling client at the UE to enable compression for the traffic, wherein the request is in response to the UE determining that the traffic corresponds to encapsulated media;
    determining a codec out of available codecs for transcoding the encapsulated media at the tunneling client and at the tunneling server;
    sending a response from the tunneling server to the UE to indicate that compression is enabled for the encapsulated media; and
    communicating compressed encapsulated media with the UE over the tunnel, wherein the compressed encapsulated media comprises a compressed payload encoded by the determined codec.

2. The non-transitory computer readable medium of claim 1,
    wherein the tunnel is configured according to a tunneled services control function (TSCF);
    wherein the request is a TSCF service request message; and
    wherein the response is a TSCF service response message.

3. The non-transitory computer readable medium of claim 1,
    wherein the UE sends a subsequent request to the tunneling server to disable compression when a tunneling client at the UE determines that a traffic pattern of the tunnel corresponds to encapsulated data; and
    wherein the tunneling server sends a corresponding response back to the UE to indicate that compression is disabled for the encapsulated data.

4. The non-transitory computer readable medium of claim 1,
    wherein the encapsulated media includes high bitrate media; and
    wherein, upon enabling compression, the tunneling client and the tunneling server transcode the high bitrate media into low bitrate media using the determined codec and communicate the low bitrate media through the tunnel.

5. The non-transitory computer readable medium of claim 1,
    wherein the UE determines that a traffic pattern of the tunnel corresponds to the encapsulated media by identifying a sequence of consecutive headers conforming to a real-time transport protocol (RTP).

6. The non-transitory computer readable medium of claim 1,
    wherein determining a codec out of available codecs comprises selecting a lower bitrate codec in comparison to a previously implemented codec.

7. The non-transitory computer readable medium of claim 1,
    wherein, upon determining that a traffic pattern of the tunnel corresponds to the encapsulated media, the tunneling client provides a corresponding notification to an RTC application at the UE; and
    wherein the notification indicates an inner socket of the encapsulated media.

8. A method of compression for real-time communications (RTC), comprising:
    establishing a tunnel with a user equipment (UE) by a tunneling server;
    communicating traffic with the UE over the tunnel;
    receiving a request from a tunneling client at the UE to enable compression for the traffic, wherein the request is in response to the UE determining that the traffic corresponds to encapsulated media;
    determining a codec out of available codecs for transcoding the encapsulated media at the tunneling client and at the tunneling server;
    sending a response from the tunneling server to the UE to indicate that compression is enabled for the encapsulated media; and
    communicating compressed encapsulated media with the UE over the tunnel, wherein the compressed encapsulated media comprises a compressed payload encoded by the determined codec.

9. The method of claim 8,
    wherein the tunnel is configured according to a tunneled services control function (TSCF);
    wherein the request is a TSCF service request message; and
    wherein the response is a TSCF service response message.

10. The method of claim 8,
    wherein the UE sends a subsequent request to the tunneling server to disable compression when a tunneling client at the UE determines that a traffic pattern of the tunnel corresponds to encapsulated data; and
    wherein the tunneling server sends a corresponding response back to the UE to indicate that compression is disabled for the encapsulated data.

11. The method of claim 8,
    wherein the encapsulated media includes high bitrate media; and wherein, upon enabling compression, the tunneling client and the tunneling server transcode the high bitrate media into low bitrate media using the determined codec and communicate the low bitrate media through the tunnel.

12. The method of claim 8,
wherein the UE determines that a traffic pattern of the tunnel corresponds to the encapsulated media by identifying a sequence of consecutive headers conforming to a real-time transport protocol (RTP).

13. The method of claim 8,
wherein determining a codec out of available codecs comprises selecting a lower bitrate codec in comparison to a previously implemented codec.

14. The method of claim 8,
wherein, upon determining that a traffic pattern of the tunnel corresponds to the encapsulated media, the tunneling client provides a corresponding notification to an RTC application at the UE; and
wherein the notification indicates an inner socket of the encapsulated media.

15. A system for compression of real-time communications (RTC), comprising:
an establishing module that establishes a tunnel with a user equipment (UE) by a tunneling server;
a communicating module that communicates traffic with the UE over the tunnel;
a receiving module that receives a request from a tunneling client at the UE to enable compression for the traffic, wherein the request is in response to the UE determining that the traffic corresponds to encapsulated media;
a determining module that determines a codec out of available codecs for transcoding the encapsulated media at the tunneling client and at the tunneling server;
a sending module that sends a response from the tunneling server to the UE to indicate that compression is enabled for the encapsulated media; and
a communicating module that communicates compressed encapsulated media with the UE over the tunnel, wherein the compressed encapsulated media comprises a compressed payload encoded by the determined codec.

16. The system of claim 15,
wherein the tunnel is configured according to a tunneled services control function (TSCF);
wherein the request is a TSCF service request message; and
wherein the response is a TSCF service response message.

17. The system of claim 15,
wherein the UE sends a subsequent request to the tunneling server to disable compression when a tunneling client at the UE determines that a traffic pattern of the tunnel corresponds to encapsulated data; and
wherein the tunneling server sends a corresponding response back to the UE to indicate that compression is disabled for the encapsulated data.

18. The system of claim 15,
wherein the encapsulated media includes high bitrate media; and
wherein, upon enabling compression, the tunneling client and the tunneling server transcode the high bitrate media into low bitrate media using the determined codec and communicate the low bitrate media through the tunnel.

19. The system of claim 15,
wherein the UE determines that a traffic pattern of the tunnel corresponds to the encapsulated media by identifying a sequence of consecutive headers conforming to a real-time transport protocol (RTP).

20. The system of claim 15,
wherein determining a codec out of available codecs comprises selecting a lower bitrate codec in comparison to a previously implemented codec.

* * * * *